INVENTOR.
Charles D. Woodward
BY
D. D. McGraw
ATTORNEY

United States Patent Office 3,671,084
Patented June 20, 1972

3,671,084
ANTILOCK MODULATOR WITH MECHANICALLY RESETTABLE CONTROL VALVE
Charles D. Woodward, Louisville, Ky., assignor to General Motors Corporation, Detroit, Mich
Filed Oct. 6, 1970, Ser. No. 78,465
Int. Cl. B69t 8/10
U.S. Cl. 303—21 F
4 Claims

ABSTRACT OF THE DISCLOSURE

An antilock brake pressure modulator includes a spring supported piston which holds the modulator check valve unseated and a normally open modulator control valve which is mechanically resettable when the piston reaches the end of its brake releasing stroke.

---

Figure 1:
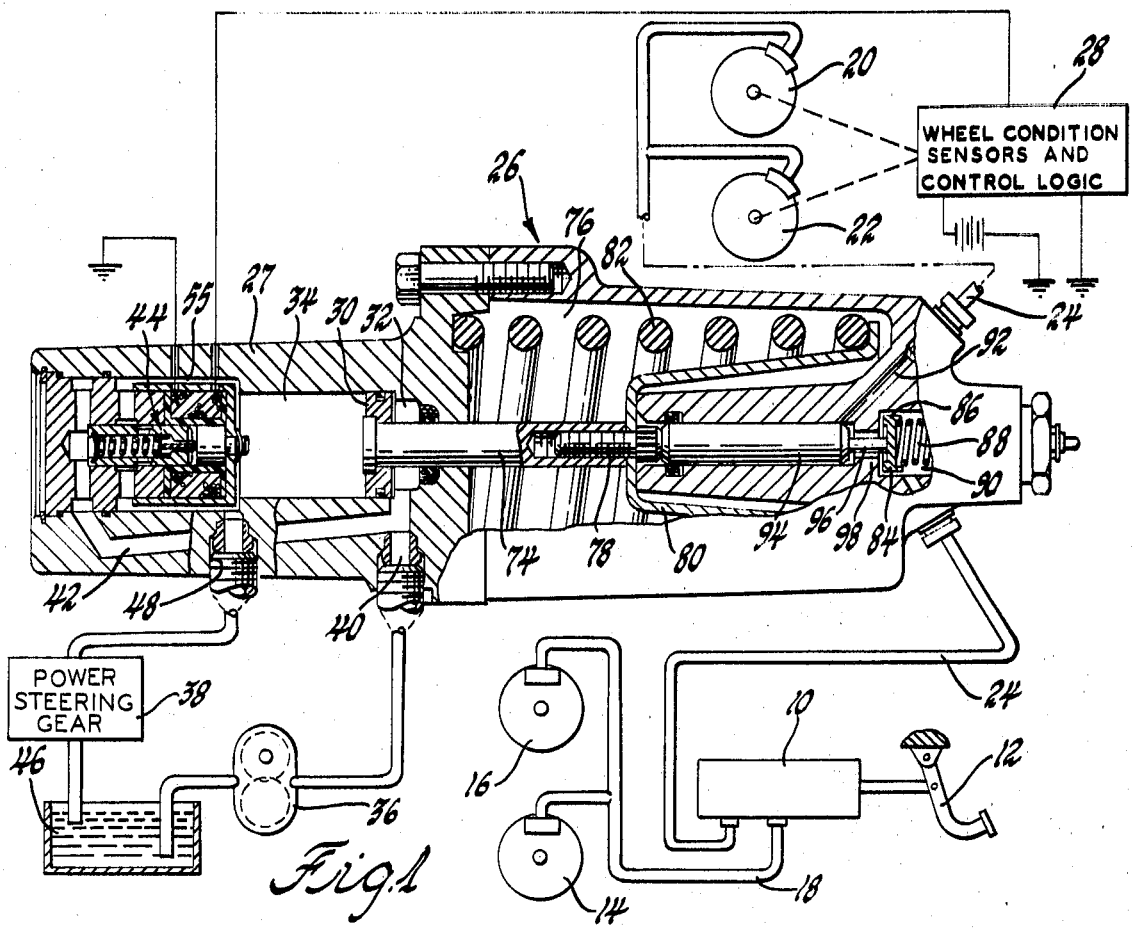

The invention relates to an improved brake apply pressure modulator and more particularly to a brake pressure modulator having an integrally housed control valve which provides modulator piston actuating pressure variations in response to the sensed wheel condition. The invention includes a spring supported piston which holds the modulator check valve unseated and a modulator control valve which is mechanically reset by the modulator piston when it reaches the end of the brake release stroke.

The brake pressure modulator is located intermediate the master cylinder and the vehicle wheel brake or brakes to be controlled. The modulator is hydraulically operated and is illustrated as receiving operating fluid from the power steering pump. The operating fluid is communicated directly to one side of the modulator piston, through a normally open modulator control valve to the other side of the modulator piston and then through the power steering gear to the power steering reservoir. During normal brake operation pressure on both sides of the modulator piston is substantially zero and the piston supporting spring holds the modulator check valve unseated permitting free fluid communication between the master cylinder and the controlled vehicle wheel brakes. It is noted that any back pressure resulting from the power steering gear located downstream from the modulator acts upon both sides of the modulator piston and therefore has no effect on the modulator. The modulator control valve is electrically actuatable by a signal received from a suitable wheel condition sensor and control logic to block fluid flow through the modulator thereby causing a rapid pressure increase on the side of the modulator piston which communicates directly with the power steering pump. This pressure increase causes the modulator piston to move in a direction which seats the modulator check valve and increases the volume of the fluid conduit communicating with the controlled vehicle wheels to release the vehicle wheel brakes. The operating fluid displaced by brake releasing movement of the modulator piston maintains flow to the power steering gear. When the brake pressure has been sufficiently released to allow acceleration of the controlled vehicle wheels, the electrical signal generated by the wheel condition sensor and control logic is removed and the modulator control valve is spring returned to the normally open position allowing the resumption of fluid flow from the power steering pump through the modulator control valve to the power steering reservoir. The resulting termination of the pressure acting on the modulator piston permits the modulator piston supporting spring to forcibly return the modulator piston to the normal position thereby increasing the brake pressure to reapply the brakes and opening the modulator check valve to restore free fluid communication between the master cylinder and the controlled vehicle wheel brakes. A flow restricting orifice limits the rate at which the hydraulic fluid is displaced from the one side of the modulator piston so as to control the rate at which the piston is moved to reapply the brake pressure. It is a feature of the invention that the modulator control valve is located in the modulator housing along the axis of the modulator piston so that the modulator piston operatively engages the modulator control valve when the modulator piston has reached its full travel in the brake releasing direction so as to mechanically reset the modulator control valve to the normally open position. The modulator control valve reset feature and the piston supporting spring cooperate to provide an improved brake pressure modulator which prevents over-travel of the modulator piston.

In the drawings:
FIG. 1 is a schematic illustration of the wheel brake anti-lock system including a brake pressure modulator embodying the invention and having parts broken away in section; and
FIG. 2 is an enlarged fragmentary view of the brake pressure modulator of FIG. 1.

Referring to FIG. 1, the vehicle wheel brake system includes a master cylinder 10 which is operated by pedal 12. The master cylinder 10 is illustrated as being of the dual pressure chamber type with one chamber connected to one pair of vehicle wheel brakes 14 and 16 through conduit 18. The other chamber of the master cylinder 10 is connected to the other pair of vehicle wheel brakes 20 and 22 through conduit 24. Fluid pressure modulator assembly 26 is located in conduit 24 intermediate the master cylinder 10 and the vehicle wheel brakes 20 and 22. The electronic wheel condition sensors and control logic 28, a suitable example of which is disclosed in U.S. Pat. 3,524,685 Harned et al., sense the condition of controlled vehicle wheel brakes 20 and 22 and provide an electrical signal for controlling the modulator assembly 26.

Modulator assembly 26 includes a housing 27 in which piston 30 is positioned to provide a power wall which forms variable pressure chambers 32 and 34. The power steering pump 36 provides operating fluid to the variable pressure chamber 32 through inlet port 40. Fluid passage 42 communicates the operating fluid to the variable pressure chamber 34 through the modulator control valve assembly 44. Operating fluid from variable pressure chamber 34 is communicated through outlet port 48 and power steering gear 38 to the power steering reservoir 46.

Figure 2:
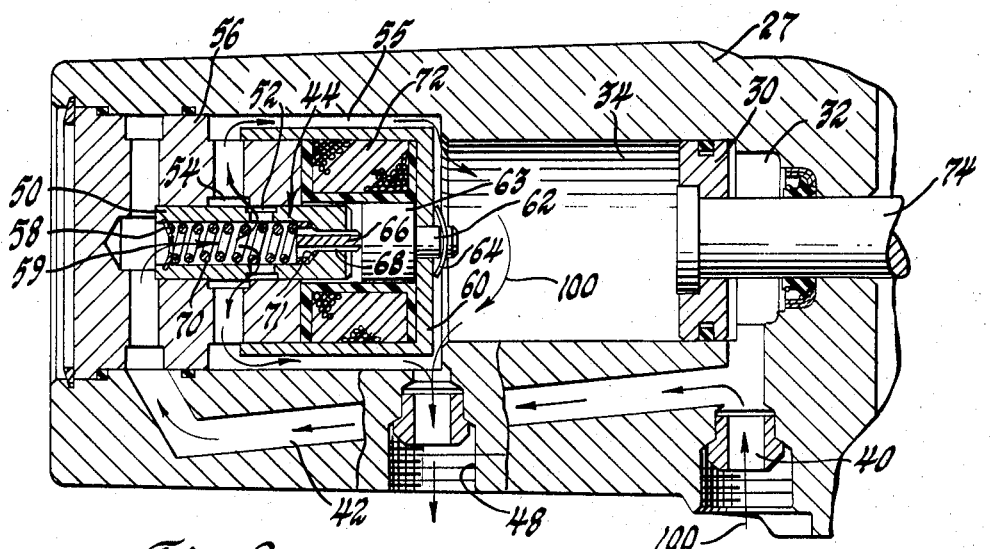

Modulator control valve assembly 44, best shown in FIG. 2, includes an annular valve spool 50 having a port 52 which cooperates with the port 54 of valve housing 56 to selectively permit and block communication of operating fluid from fluid passage 42 to fluid passage 55 which connects with variable pressure chamber 32. Housing 60 is attached to housing 56 and slidably receives a relief pin 62 having a shoulder 63 which normally abuts housing 56 at the urging of spring washer 64. Spring washer 64 attaches relief pin 62 to the housing 60 and cooperates with shoulder 63 to permit a predetermined amount of relief pin movement. The ring 58 is engaged in the inlet end of annular valve spool and provides an orifice 59 which controls the rate of operating fluid flow through the modulator control valve assembly 44. Port member 66 is slidably received in the other end of the bore of annular valve spool 50 and provides a fluid passage 68 which communicates operating fluid pressure to the end of valve spool 50 so as to provide a hydraulically balanced valve spool. Valve spring 70 is seated at washer 58 and port member 66, urges port member 66 into engagement of shoulder 71 of the valve spool 50, and acts to position the valve spool 50 in its normally open position as shown in FIG. 2. Solenoid coil 72 is enclosed in housing 60 and encircles valve spool 50. The solenoid coil 72 is energized by an electrical signal received from the wheel condition sensor and control logic unit 28 to move annular valve spool 50 rightwardly blocking fluid communication between valve ports 52 and 54.

Piston 30 includes a rod 74 which sealingly extends through a wall of housing 27 into spring chamber 76. Bolt 78 attaches spring retainer 80 to the rod 74. Supporting spring 82 is seated at housing 27 and engages spring retainer 80 urging piston 30 and retainer 80 rightwardly. Retainer 80 engages a portion of housing 27 so as to define the rest position of piston 30. Modulator check valve 84, illustrated as including valve member 86, valve spring 88 and annular valve seat 98, is positioned in brake fluid inlet chamber 90 and when unseated permits communication of the brake pressure between inlet chamber 90 and outlet chamber 92. Plunger 94 is reciprocably mounted in a portion of housing 27 and forms a movable wall of outlet chamber 92. One end of plunger 94 abuts bolt 78 and the other end forms a pin 96 which extends through the annular valve seat 98 and is of sufficient length so as to normally hold modulator check valve 84 unseated when the piston 30 is in its rest position.

OPERATION

During normal brake operation, supporting spring 82 acts through retainer 80, bolt 78 and plunger 94 to hold the modulator check valve 84 unseated permitting free fluid communication between the master cylinder 10 and the controlled vehicle wheel brakes 20 and 22. Fluid flow generated by power steering pump 36 is communicated to inlet chamber 40. Referring to FIG. 2, the arrows 100 show the direction of fluid flow through the modulator assembly. Solenoid 72 is deenergized allowing valve spring 70 to hold the valve spool 50 in its normally open position permitting fluid flow from fluid passage 42 through the bore of the annular valve spool 50, valve ports 52 and 54, passage 55, variable pressure chamber 34, and through outlet port 48 to the power steering gear 38 and the power steering reservoir 46. Orifice 59 is sized to permit unrestricted flow of the pump generated fluid. The operating fluid pressure in both variable pressure chambers 32 and 34 is essentially zero. Any back pressure from the power steering gear has no effect upon the modulator since it is communicated to both sides of the piston 30.

If the wheel condition sensor and control logic 28 senses an incipient wheel locking condition, an electrical signal is transmitted to solenoid coil 72. Energization of solenoid coil 72 causes valve spool 50 to shift rightwardly into engagement of relief pin 62 blocking fluid flow from valve port 52 to valve port 54. When the valve spool 50 shifts to the right the port member 66, preferably constructed of a non-magnetizable material, remains stationary thereby compressing valve spring 70. The closing of modulator control valve 44 blocks fluid flow from pump 36 to variable pressure chamber 34 and reservoir 46. The resulting pressure differential between variable pressure chamber 32 which communicates directly with pump 36 and variable pressure chamber 34 which communicates with the reservoir 46 acts on piston 30 and with the aid of the brake fluid pressure in outlet chamber 92 acting on the end of the plunger 94 causes piston 30 to move leftwardly compressing piston supporting spring 82. This movement of piston 30 permits plunger 94 to follow at the urging of the brake fluid pressure acting on its end. Movement of plunger 94 increases the volume of outlet chamber 92 thereby removing brake applying pressure from the controlled vehicle wheel brakes 20 and 22. Leftward movement of piston 30 displaces operating fluid from variable pressure chamber 34 to maintain flow through the power steering gear 38.

When sufficient fluid pressure has been removed from the controlled vehicle wheel brakes 20 and 22 to arrest the impending wheel lock condition, the wheel condition sensor and control logic 28 removes the electrical signal from solenoid coil 72. When the solenoid coil 72 is deenergized, spring 70 acts to shift annular valve spool 50 leftwardly to its normally open position permitting fluid communication from valve port 52 to valve port 54, thereby restoring fluid flow from pump 36 to reservoir 46. Piston supporting spring 82 urges piston 30 rightwardly displacing the operating fluid from variable pressure chamber 32. The orifice 59 is sized to restrict the combined flow from pump 36 and variable pressure chamber 32 to limit the rate of piston movement. The rightward movement of piston 30 at the urging of supporting spring 82 forces the abutting plunger 94 rightwardly decreasing the volume of outlet chamber 92 and thereby increasing the brake apply pressure at the controlled vehicle wheel brakes 20 and 22. When the plunger 94 has moved sufficiently rightwardly, it unseats check valve 84 restoring free fluid communication between the master cylinder 10 and the controlled wheel brakes 20 and 22.

If during the brake release mode of operation the annular valve spool 50 sticks, or a similar condition prevents the valve spool 50 from returning to the normally open position when the impending wheel lock condition has been arrested, the valve spool is mechanically reset when the piston 30 has moved to its furthest leftward position. When the leftwardly moving piston 30 engages the relief pin 62, the spring washer 64 is collapsed and the relief pin is moved leftwardly. Since the valve spool 50 abuts the relief pin 62 when in the closed position, it is also moved leftwardly and is thereby returned to the normally open position. The resulting flow of operating fluid from variable pressure chamber 32 allows supporting spring 82 to move piston 30 rightwardly. As piston 30 moves, the relief pin 62 and port member 66 follow to return to their normal positions.

The piston 30 is thus prevented from remaining in the full leftward position. Thus, through the cooperation of the piston supporting spring 82 and the mechanical reset feature of the modulator control valve 44, an improved brake pressure modulator is provided.

What is claimed is:

1. A pressure modeulator for use in a system having pump means providing a continuous flow of modulator operating fluid, said modulator having a spring supported piston movable in response to pressure variations and a modulator control valve providing pressure variations in response to a sensed condition and comprising:

a housing having a pressure inlet and a pressure outlet chamber formed therein;

check valve means in said housing between said inlet and outlet chambers permitting fluid communication therebetween when unseated;

said piston forming a wall of said outlet chamber and normally engaging and holding unseated said check valve, said piston being movable in one direction to disengage said check valve and increase the volume of said outlet chamber whereby said check valve is seated and said outlet chamber pressure decreased;

said modulator control valve being located in said housing and having a normal position, said modulator control valve being shifted in response to said sensed condition thereby creating said pressure variations causing movement of said piston in said one direction, said piston being engageable with said modulator control valve upon full piston travel in said one direction to return said modulator control valve to said normal position thereby removing said pressure variation and allowing spring return of said piston to the normal condition whereby said outlet chamber pressure is increased and said check valve unseated.

2. A brake pressure modulator for use in a vehicle braking system having pump means providing a continuous flow of modulator operating fluid, said modulator having a spring supported piston movable in response to pressure variations and a modulator control valve providing pressure variations in response to a sensed condition and comprising:

a housing having a brake pressure inlet and a brake pressure outlet chamber formed therein;

check valve means in said housing between said inlet and outlet chambers permitting said fluid communication therebetween when unseated;

said piston forming a wall of said outlet chamber and normally engaging and holding unseated said check valve, said piston being movable in one direction to disengage said check valve and increase the volume of said outlet chamber whereby said check valve is seated and said outlet chamber pressure decreased;

said modulator control valve being located in said housing and having a normal position, said modulator control valve being shifted in response to said sensed condition thereby creating said pressure variations causing movement of said piston in said one direction, said piston being engageable with said modulator control valve upon full piston travel in said one direction to return said modulator control valve to said normal position thereby removing said pressure variation and allowing spring return of said piston to the normal condition whereby said outlet chamber pressure is increased and said check valve unseated;

and fluid flow restriction means controlling the rate of fluid flow from said one side of said piston whereby the rate of piston return to the normal position is controlled.

3. A brake pressure modulator for use in a vehicle braking system having a source of fluid pressure, a fluid pressure operated wheel brake means, and pump means providing a continuous flow of modulator operating fluid, said modulator having a piston movable in response to pressure variations and a modulator control valve providing pressure variations in response to a sensed wheel condition and comprising:

a housing having formed therein a brake pressure inlet chamber communicating with said fluid pressure source and a brake pressure outlet chamber communciating with said fluid pressure operated wheel brake means;

check valve means in said housing between said inlet and outlet chambers permitting fluid communication therebetween when unseated;

a plunger operatively engaged by said piston and forming a wall of said brake pressure outlet chamber;

spring means acting on said piston and urging said abutting plunger to a normal position engaging and holding unseated said check valve, said plunger being movable by brake pressure in one direction when so permitted by movement of said piston to disengage said check valve and increase the volume of said outlet chamber whereby said check valve is seated and said outlet chamber pressure decreased to isolate said wheel brake means from said brake pressure source and release said wheel brake means;

said pump means providing a continuous flow of modulator operating fluid directly to one side of said piston, and receiving operating fluid from the other side of said piston;

said modulator control valve being located in said housing and having a normally open position channeling said operating fluid at substantially zero pressure from the one side to the other side of said piston, said modulator control valve being closed in response to said sensed condition thereby blocking fluid communication to said other side of said piston and causing a pressure increase on said one side of said piston moving said piston in said one direction, said piston being engageable with said modulator control valve upon full piston travel in said one direction to return said modulator control valve to said normally open position dissipating said pressure increase and allowing return of said piston by said spring means to the normal position whereby said outlet chamber pressure is increased to reapply said wheel brake means and said check valve is unseated to restore fluid communication between said fluid pressure source and said wheel brake means;

and fluid flow restriction means controlling the rate of fluid flow from said one side of said piston whereby the rate of piston return to said normal position is controlled.

4. A brake pressure modulator for use in a vehicle braking system having a source of fluid pressure, a fluid pressure operated wheel brake means, and pump means providing a continuous flow of modulator operating fluid, said modulator having a piston movable in response to pressure variations and a modulator control valve providing pressure variations in response to a sensed wheel condition and comprising:

a housing having formed therein a brake pressure inlet chamber communicating with said fluid pressure source and a brake pressure outlet chamber communciating with said fluid pressure operated wheel brake means;

check valve means in said housing between said inlet and outlet chambers permitting fluid communication therebetween when unseated;

a plunger operatively engaged by said piston and forming a wall of said brake pressure outlet chamber;

spring means acting on said piston and urging said abutting plunger to a normal position engaging and holding unseated said check valve, said plunger being movable by brake pressure in one direction when so permitted by movement of said piston to disengage said check valve and increase the volume of said outlet chamber whereby said check valve is seated and said outlet chamber pressure decreased to isolate said wheel brake means from said brake pressure source and release said wheel brake means;

said pump means providing a continuous flow of modulator operating fluid directly to one side of said piston, and receiving operating fluid from the other side of said piston;

said modulator control valve including, a valve housing in said housing having a first valve port communicating with said other side of said piston;

an annular valve spool slidable in said valve housing and having a bore therethrough, receiving operating fluid from said one side of said piston, a second valve port extending radially to connect said bore and said first valve port when said valve spool is in a normal open position whereby operating fluid is channeled at substantially zero pressure to the other side of said piston;

fluid passage means in said modulator control valve communicating operating fluid between the end sections of said valve spool to substantially hydraulically balance said valve spool;

actuating means responsive to said sensed wheel condition to move said annular valve spool from said normally open position to said closed position causing a pressure increase on said one side of said piston moving said piston in said one direction;

fluid flow restriction means in the inlet end of said bore of said annular valve spool;

a port member slidable in the other end of said bore and extending outward from said annular valve spool a distance corresponding to the distance of valve spool travel between said normally open position and a closed position blocking communication between said first and second valve ports;

means associated with said valve housing and including yieldable means attaching said associated means to said housing and establishing therewith a normal position of said associated means, said annular valve spool engaging said associated means when in said closed position, said yieldable means yielding upon engagement with said piston upon full travel thereof in said one direction to allow movement of said associated means returning said abutting annular valve spool to said open position whereby the pressure increase is dissipated and said piston moved by said spring means to increase outlet chamber pressure to reapply said wheel brake means and said check valve is unseated to restore fluid communication between said fluid pressure source and said wheel brake means;
and spring means acting between said annular valve spool and said port member and urging said annular valve spool upon release of said actuating means to the normal open position through the engagement of said port member with said associated means.

References Cited

UNITED STATES PATENTS

| | | | |
|---|---|---|---|
| 3,285,141 | 11/1966 | Palmer, Jr. | 91—368 |
| 3,560,056 | 2/1971 | Stelzer | 303—21 F |

GEORGE L. A. HALVOSA, Primary Examiner

U.S. Cl. X.R.

91—368; 303—10